Dec. 2, 1952  J. J. VAN LOGHEM  2,620,089
SERVING DISH
Filed Nov. 21, 1947
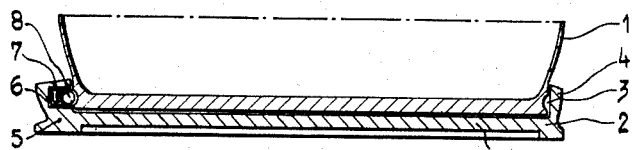
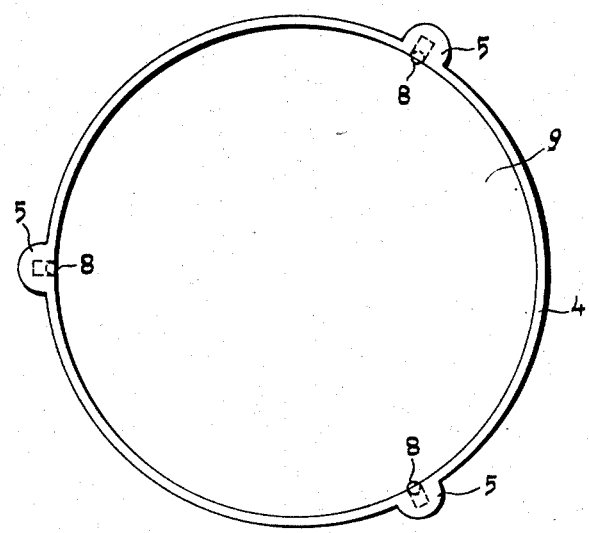
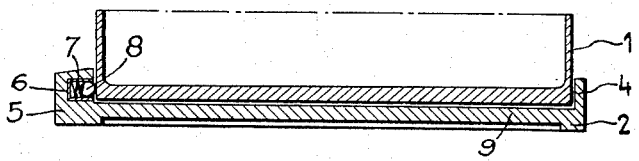
Inventor
Johannes Jacobus van Loghem
By Robert E. Burns
Attorney

Patented Dec. 2, 1952

2,620,089

UNITED STATES PATENT OFFICE 2,620,089

SERVING DISH

Johannes Jacobus van Loghem, Amsterdam, Netherlands

Application November 21, 1947, Serial No. 787,313
In the Netherlands May 25, 1945

Section 1, Public Law 690, August 8, 1946
Patent expires May 25, 1965

2 Claims. (Cl. 220—69)

The invention relates to a serving dish, and more particularly to a serving dish which may also be used as a cooking pan.

It is an object of the invention to provide means whereby food may be served in the same container in which it has been cooked, so that it is not cooled down by the usual transfer from a cooking pan to a serving dish.

Another object of the invention is to provide means whereby a substantial part of the usual dinner-set is made superfluous, so that a considerable saving of initial expenses may be obtained.

Still another object is to provide means whereby a substantial reduction of domestic labour may be obtained, since much less time has to be spent for the washing up of kitchen utensils.

The serving dish according to the invention comprises a cooking pan and an easily detachable foot secured to the underside thereof.

The invention may be applied to any kind of cooking utensil, such as a sauce pan, a frying pan etc. The cooking pan may be used for preparing a dish in the customary manner, and as soon as the food is ready for use, the foot is secured to the cooking pan and the food is served in the serving dish obtained thereby.

Preferably the foot comprises a closed annular body enclosing the underside of the cooking pan. It may consist at least partially of a heat insulating or non-fireproof material, such as an artificial resin compound.

Preferably the foot is provided with a protective bottom plate lying underneath the bottom of the cooking pan when the foot has been secured thereto. The heat radiation of the cooking pan in a downward direction is thereby substantially completely intercepted, so that a damage of the underlying table leaf or table cloth is prevented. Also the danger of soiling the table by soot or ash particles falling from the cooking pan is removed thereby.

The bottom plate may lie at a higher level than the base of the foot and may consist of a heat insulating or non-fireproof material, such as an artificial resin compound. It may be an integral part of the foot, or may be secured to the remaining parts thereof by means of screws or the like. It is also possible to use a bottom plate lying loosely within the annular body forming the main part of the foot.

In order to secure the foot to the cooking pan, it may be clamped around the underside thereof. In a preferred embodiment of the invention the cooking pan is provided with a circumferential groove at the underside of the side wall, and the foot has an upright rim enclosing the underside of the cooking pan, whereas a plurality of inwardly projecting coupling balls are resiliently mounted in the said rim. The cooking pan may then be detached from the foot by a simple pressure of the finger, and in order to secure the foot to the cooking pan the latter has only to be pressed down into the space enclosed by the upright rim until the coupling balls have snapped into the groove of the rim.

The invention will be more clearly understood by reference to the accompanying drawing, wherein Fig. 1 is a vertical cross section through part of a serving dish according to the invention, consisting of a cooking pan and an easily detachable foot;

Fig. 2 is a top view of the foot of the serving dish shown in Fig. 1;

Fig. 3 is a vertical cross section of a modification of the embodiment shown in Figs. 1 and 2.

Referring to Figs. 1 and 2, 1 indicates an aluminium cooking pan, and 2 a foot consisting of a phenolic resin compound, such as "Bakelite." At the outside of the cooking pan and near the bottom thereof, a circumferential groove 3 is provided. The foot 2 has an upright rim 4 enclosing the underside of the cooking pan, which is provided with three bosses 5, in each of which is mounted a steel tube 6, containing a pressure spring 7 and a coupling ball 8. The coupling balls 8 are so positioned that their inwardly projecting parts may snap into the groove 3, thereby securing the foot to the cooking pan. In order to prevent a heat radiation in a downward direction a protective bottom plate 9 is provided. As shown in Fig. 1 the bottom plate 9 may be an integral part of the foot, and it may lie at a higher level than the base of the foot.

Fig. 3 shows a modification of the embodiment of the invention illustrated in Figs. 1 and 2, wherein the groove 3 has been omitted. I have found that the pressure of the coupling balls generally is sufficient to secure the foot to the cooking pan also when the latter has a smooth surface without any grooves or the like, especially when the foot has been made out of a material of low specific gravity, such as for instance "Bakelite." Fig. 3 shows a cylindrical cooking pan 1 and a foot 2 similar to the foot shown in Figs. 1 and 2, the foot being secured to the cooking pan by the pressure exerted by the coupling balls 8 on the smooth cylindrical surface of the cooking pan. This arrangement makes it possible to provide a foot for any existing cooking pan of the usual cylindrical shape so that the same may be adapted to be used as a serving dish in the manner according to the present invention. Feet may be produced in several standard dimensions corresponding to the standard dimensions of existing cooking pans.

While I have described particular embodiments of my invention for purposes of illustration, it will be understood that various modifications and adaptations thereof may be made within the spirit of the invention as set forth in the appended claims.

I claim:

1. The combination comprising a cooking pan and an easily detachable heat insulating foot for said pan, said cooking pan having an exteriorly flat bottom and side walls extending upwardly therefrom and formed from heat resisting metal and adapted to be used for cooking food on a stove and the like, said foot being formed from a heat insulating material and comprising a base portion and an upstanding rim portion at least partly enclosing the lower portion of the side walls of said pan, and attaching means mounted in said foot extending only between said rim portion and the side portion of the pan for detachably securing said foot to said pan, whereby said pan may be used as a serving dish after cooking, said attaching means comprising three axially spring pressed bosses extending from the interior of said rim portion at equally spaced points around the rim and resiliently and frictionally engaging the side walls of the pan.

2. The combination comprising a cooking pan and an easily detachable heat insulating foot for said pan, said cooking pan having an exteriorly flat bottom and side walls extending upwardly therefrom and formed from heat resisting metal and adapted to be used for cooking food on a stove and the like, said foot being formed from a heat insulating material and comprising a base portion and an upstanding rim portion at least partly enclosing the lower portion of the side walls of said pan, and attaching means mounted in said foot extending only between said rim portion and the side portion of the pan for detachably securing said foot to said pan, whereby said pan may be used as a serving dish after cooking, said attaching means comprising three axially spring pressed bosses extending from the interior of said rim portion at equally spaced point around the rim and resiliently and frictionally engaging the side walls of the pan, and said pan having recessed means for receiving said spring pressed bosses.

JOHANNES JACOBUS van LOGHEM.

REFERENCES CITED

The following references are of record in the file of this patent:

UNITED STATES PATENTS

| Number | Name | Date |
|---|---|---|
| 648,436 | Rider | May 1, 1900 |
| 862,953 | Westlake | Aug. 13, 1907 |
| 864,556 | Recter | Aug. 27, 1907 |
| 1,226,101 | Marsden | May 15, 1917 |
| 1,635,189 | McClure | July 12, 1927 |
| 1,875,906 | Zarobsky | Sept. 6, 1932 |
| 2,119,342 | Morris | May 31, 1938 |
| 2,147,482 | Butler | Feb. 14, 1939 |
| 2,170,880 | Wagner | Aug. 29, 1939 |
| 2,323,356 | Rosay | July 6, 1943 |